United States Patent [19]
Owens, Jr.

[11] Patent Number: 5,919,023
[45] Date of Patent: Jul. 6, 1999

[54] COMPACT OVERHEAD CONVEYOR

[75] Inventor: Donald E. Owens, Jr., Mason, Ohio

[73] Assignee: OCS-IntelliTrak, Inc., Cincinnati, Ohio

[21] Appl. No.: 08/992,794

[22] Filed: Dec. 18, 1997

[51] Int. Cl.$^6$ ................................................. B65G 29/00
[52] U.S. Cl. ........................................ 414/155; 198/465.4
[58] Field of Search ................................... 414/150, 151,
414/153, 154, 157, 158, 155, 172, 173,
196; 198/465.4, 687.1

[56] References Cited

U.S. PATENT DOCUMENTS

| | | | |
|---|---|---|---|
| 618,396 | 1/1899 | Cowles | 198/465.4 X |
| 2,039,129 | 4/1936 | Vance et al. | 414/151 X |
| 2,377,392 | 6/1945 | Wiley | 414/151 |
| 2,947,407 | 8/1960 | Wood | 198/465.4 X |
| 3,164,104 | 1/1965 | Hunt | 104/166 |
| 3,850,280 | 11/1974 | Ohrnell | 198/687.1 |
| 4,203,511 | 5/1980 | Uhing | 198/465.4 X |
| 4,279,201 | 7/1981 | Solomon | 198/465.4 X |
| 4,351,241 | 9/1982 | Brems et al. | 198/465.4 X |
| 4,917,369 | 4/1990 | Moll et al. | 198/465.4 X |
| 5,002,176 | 3/1991 | Lötzer et al. | 198/465.4 |
| 5,769,949 | 6/1998 | Crenkus et al. | 198/465.4 X |
| 5,785,168 | 7/1998 | Beall, Jr. | 198/465.4 |

FOREIGN PATENT DOCUMENTS 3801056  7/1989  Germany .............................. 198/465.4

*Primary Examiner*—David A. Bucci
*Attorney, Agent, or Firm*—Fay, Sharpe, Beall, Fagan, Minnich & McKee

[57] ABSTRACT

An overhead conveyor is operated at a slower speed within the treatment area or buffer than the speed of a conveyor delivering products to the treatment area or buffer and the speed of a conveyor removing products from the treatment area or buffer. Elongated products are delivered to the treatment area or buffer so that the direction of product elongation corresponds with the conveying direction and are removed from the treatment area or buffer so that the direction of product elongation corresponds with the conveying direction, particularly by being suspended from two carriages of an overhead conveyor system. Within the treatment area or buffer, the two carriages that are serially located or in tandem while traveling on the delivery conveyor and the exit conveyor, are placed on separate parallel conveyors so that the orientation of the elongation direction of the products is perpendicular to the conveying direction within the treatment area or buffer. With guides or a transfer, only one carriage of the two carriages handling a single product need be driven, and the other carriage may simply by conveyed on a gravity or drag conveyor or rail.

13 Claims, 3 Drawing Sheets

COMPACT OVERHEAD CONVEYOR

BACKGROUND OF THE INVENTION

The present invention relates to a product treating system including a conveyer for transporting products through a treatment area, for example an oven for drying or setting a coating that was applied to the products at a treatment station.

Overhead conveyers are particularly advantageous in this environment. A continuous chain driven overhead conveyer has been used to bring products into a drying oven and pass them through a serpentine path within the drying oven so as to maximize the amount of time that they are in the drying oven for the particular oven size. It is well recognized that the products, in such a system, stay in the oven or treatment area for a relatively long period of time, as compared to the amount of time they may stay within a loading or unloading station or at a spray booth, or the like. It is desirable to construct the oven of a smallest size as possible under the circumstances, to not only save the initial cost of the oven, but reduce the square footage plant requirement of the oven and reduce the heat loss from the oven. Similar problems relate to other treatment-type enclosures or areas other than an oven.

The present invention uses an overhead conveyer of the type disclosed in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell. By reference, the disclosure of these U.S. patents is incorporated herein in their entirety as a disclosure of the overhead conveyer (drive shaft, bearings, drive motor, transmission and carriage) of the present invention.

SUMMARY OF THE INVENTION

It is the object of the present invention to provide a product treating system wherein the products are moved through a treatment or buffer area in an expeditious manner to save initial and operating cost of the treatment area. More particularly, an overhead conveyor is operated at a slower speed within the treatment area or buffer than the speed of a conveyor delivering products to the treatment area or buffer and the speed of a conveyor removing products from the treatment area or buffer. More particularly, with respect to elongated products, such elongated products are delivered to the treatment area or buffer so that the direction of product elongation corresponds with the conveying direction and are removed from the treatment area or buffer so that the direction of product elongation corresponds with the conveying direction, particularly by being suspended from two carriages of an overhead conveyor system. Within the treatment area or buffer, the two carriages that are serially located or in tandem while traveling on the delivery conveyor and the exit conveyor, are placed on separate parallel conveyors so that the orientation of the elongation direction of the products is perpendicular to the conveying direction within the treatment area or buffer, and further increase the efficiency. With guides or a transfer, only one carriage of the two carriages handling a single product need be driven, and the other carriage may simply by conveyed on a gravity or drag conveyor or rail.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF THE INVENTION

Figure 1:
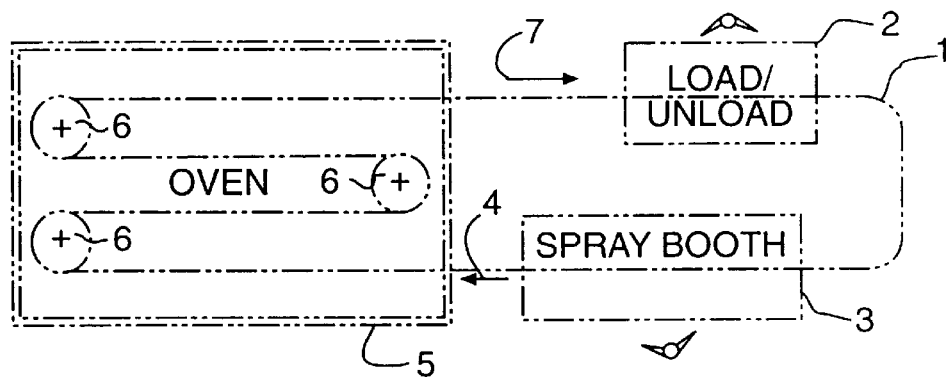
FIG. 1 is a schematic plan view of a conventional chain conveyer layout.

With a conventional chain conveyer 1 of FIG. 1, carriages (not shown) are suspended from a horizontal continuous loop chain, and one or more carriages are used to suspend each product. The finished products are unloaded and unfinished products loaded at the LOAD/UNLOAD STATION 2. The unfinished products move to the treatment station 3, for example, a spray booth where a coating (either dry or wet) is sprayed onto the products. The linear speed of the chain at all portions of the loop is identical and continuous. The freshly treated products, for example the freshly sprayed products pass through the inlet 4 of a treatment area or more specifically treatment chamber, for example an oven 5. The chain passes around a plurality of driven and idler sprockets 6, to provide a serpentine conveying path. The length of the path is determined by the number of loops in the serpentine path and is designed with the speed of the conveyer in mind so as to provide a suitable treatment time within the treatment area 5. The finished products leave the oven at the outlet 7 and proceed to the LOAD/UNLOAD STATION 2 to complete the cycle.

The present invention includes, as an initial stage, the analysis of prior art and the manner in which such prior art contributes to problems and differs from each other, although it is certainly well known that it is desirable to make the oven as small as practical and to try to maintain the time within the oven to be greater than what would ordinarily be with a continuous fixed space conveyer.

In the above mentioned conventional chain conveyer system of FIG. 1, there is a saving in the space or layout size of the oven afforded by the serpentine path of the conveyer through the oven, in recognition of the high initial cost of the oven greatly being determined by the square footage of the layout. Also, the greater the size of the oven, the greater the square footage of enclosure walls, floor and ceiling, and thereby the greater the heat loss from the oven.

The above mentioned high cost of the oven of the above described conventional system of FIG. 1 is improved when a conveyer of the type disclosed in the above mentioned U.S. patents is used in place of the chain conveyer 1 and when the conveyer is split into two sections, a first section outside of the oven 5 and a second section inside of the oven 5, with the second section operating at a slower speed than the first section. Therefore, the size of the oven can be reduced, but only when it is permissible to close up the spacing between adjacent products. However, this remedy is not particularly effective when elongated products are used wherein the elongation is preferably in the direction of the conveying path, because then the size of the sprockets must be correspondingly quite large and therefore the serpentine path cannot be compressed within the oven. Further, if the elongated products are closely spaced apart in their serial movement outside the oven, then the conveyer in the oven must run at substantially the same speed as the conveyer outside of the oven.

Figure 2:
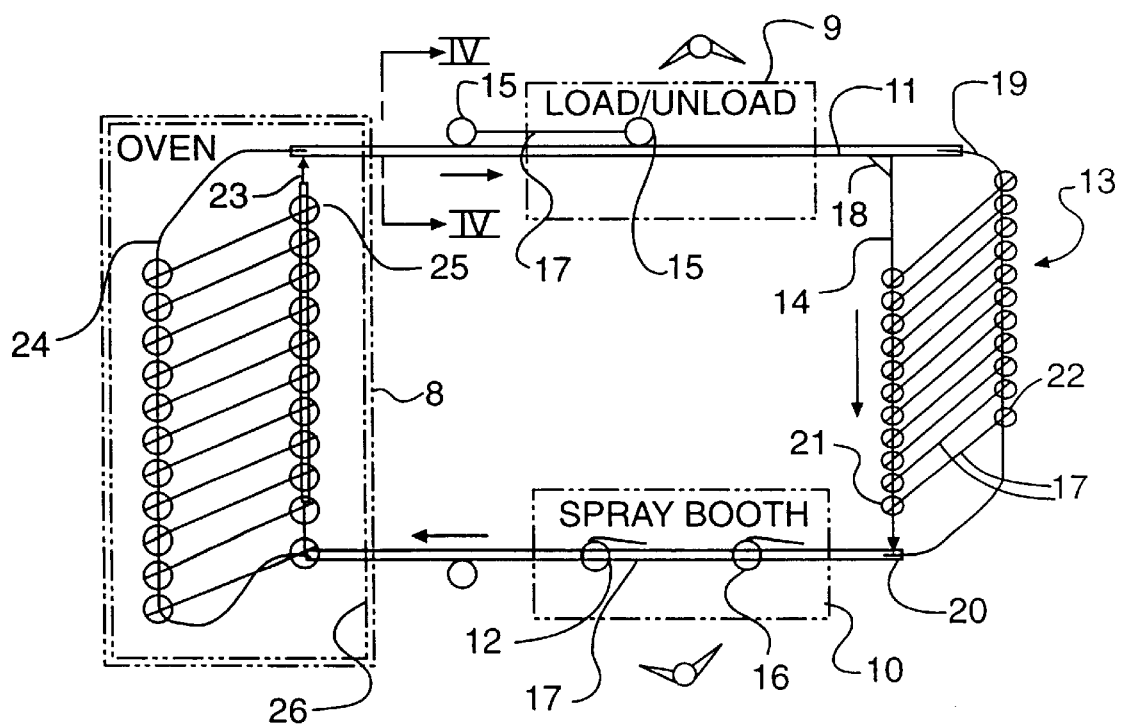
FIG. 2 is a schematic plan view of an oven and conveyer layout according to the present invention.

With the present invention of FIG. 2, overhead conveyers may be provided similar to those disclosed in the above mentioned U.S. patents, whose disclosure is incorporated herein in its entirety as examples of structure of the present conveyers. As a result, a different conveyer speed can be provided inside the oven 8 than is provided outside of the oven 8. As a result, the speed of the conveyer 11 at the LOAD/UNLOAD Station 9 may be adjusted to whatever speed is optimum at such station, and even the products 17 may be stopped at the station 9, all independently of any speed maintained elsewhere in the system, with the result that the LOAD/UNLOAD station may be of a minimum size to reduce overall plant floor space. Also the spray booth 10 may be optimized in size by independently adjusting the speed of the conveyer 12 through the spray booth station, that is, independently of the speed of the conveyers elsewhere in the system.

A buffer 13 is provided between the LOAD/UNLOAD station 9 and the treatment station 10, to compensate for the difference in speed between the stations 9 and 10, and even permit the shutting down of one of such stations for repair purposes or the like without affecting the remainder of the system. The buffer includes an overhead conveyer 14 that has its speed set independently of the speed of any of the overhead conveyers 11 and 12. In FIG. 2, it is seen that there is one pair of serially adjacent carriages 15 with a product between them on the conveyer 11, and only one pair of carriages 16 with a product 17 between them on the conveyer 12.

A transfer 18 will direct or guide, passively or actively, the upstream or lead carriage 15 to a conveyer 19 that comprises a fixed slide rail; the transfer 18 will, actively or passively, transfer or guide the downstream or lagging carriage 15 unto the driven overhead conveyor 14, so that thereby the former lagging carriage 15 now becomes the leading carriage and drags the other carriage of the pair along through the buffer 13. A second transfer 20, either actively or passively, transfers the now leading carriage 21 onto the overhead conveyer 12, where it is driven to pull the now lagging carriage 22 to the transfer 20, where the lagging carriage 22 is then transferred to the driven overhead conveyer 12. It is seen that the odd number carriages from the conveyer 11 are moved to the conveyer 19, and where the even number carriages from the conveyer 11 are moved to the conveyer 14. That is, carriages that were adjacent to each other as a pair to hold a product between them were serially aligned in tandem on the conveyer 11, but are parallel as they pass respectively on the conveyers 14 and 19.

The carriages on conveyer 14 may be closely spaced and in fact touching, and the carriages on the conveyer 19 may be similarly closely spaced or in fact touching. With an assumption that the carriages are touching and are of an effective diameter D, the distance between carriages determined by the length of the elongated product 17 is L, and the spacing between products on the conveyer 11 is S, it is seen that then the ratio of speed of the driving conveyer 11 to the speed of the driving conveyer 14 is S+2D+L/D. When the carriages and products move unto the conveyer 12, the speed of the conveyer 12 may be made greater or less than the speed of conveyer 11, by merely adjusting the spacing S.

Different speeds are physically obtained by using different drive motors/transmissions to drive different drive shafts at different speeds and/or by changing the canting angle of drive wheels relative to the drive shaft, as will become more clear when these elements are described.

In a manner similar to that described with respect to the buffer 13, the conveyers within the oven are constructed to provide a slow conveyer speed within the oven and therefore a relatively long treatment time within the oven with respect to the size of the oven. The oven has a driving conveyer 23 of the type described above and in the above mentioned U.S. patents and a free or undriven conveyer 24, for example comprising a fixed slide rail, and the operation is very much similar to the operation previously described with respect to the buffer 13.

In the oven 8, it may be preferable to have the carriages adjacent to each other on each of the conveyers 23, 24 to be spaced further apart than the minimum spacing within the buffer 13. The speed of the conveyers 23, 24 within the oven 8 is usually fixed for a specific type of treatment, for example a specific drying time but may be dependent upon many different variables, whereas the speed of the driving conveyer 14 in the buffer 13 may be automatically or manually varied depending upon the desired output spacing of carriages leaving the buffer. The buffer 13 is a FIFO buffer with respect to the products, and the oven is a FIFO treatment area with respect to the products, but as mentioned before, the leading and lagging relationship of the two carriages of each carriage pair that supports a single product are reversed upon entering each of the buffer 13 and the treatment area 8.

While the present invention has been described with respect to two carriages carrying an elongated product, three or more carriages may carry an elongated product, which would merely entail the addition of one or more drag conveyers or fixed rail conveyers in each of the buffer 13 and oven 8. The leading and lagging carriages supporting the product are respectively at the foremost ends and rearmost ends of the product. Many aspects of the present invention are applicable to placing the carriages inboard of the product ends. Advantages of placing the carriages at the ends of the products are that leading and lagging carriages then can function as bumpers, protecting the leading and lagging edges of the product moving around the conveyer system. Furthermore, the conveyers 11 and 12 may be of considerable length with many different stations or various treatment processes along there length, so that cumulative differences between serially adjacent products speed may cause one product to approach and actually bump into the serially adjacent product, and the bumpers would prevent damage. The transfers may include automatic control to reestablish fixed spacing at the outlet 25 of the oven 8 and the outlet 20 of the buffer 13, in a known matter. That is, the spacing at the inlet 26 of the oven 8 would not automatically control the spacing at the outlet 25, and similarly the spacing of the carriages coming into the transfer 18 would not automatically determine the spacing leaving the transfer 20.

Comparing the system of FIG. 2 with the system of FIG. 1, it has been determined that the system of FIG. 2 provides a fifty percent reduction in oven space requirements, with all other conditions being identical for one commercial application.

In a conventional factory it is desirable to move loads along a transporting path that is predominately horizontal, but which may also travel uphill, downhill, divert between subpaths, and the like.

Figure 4:
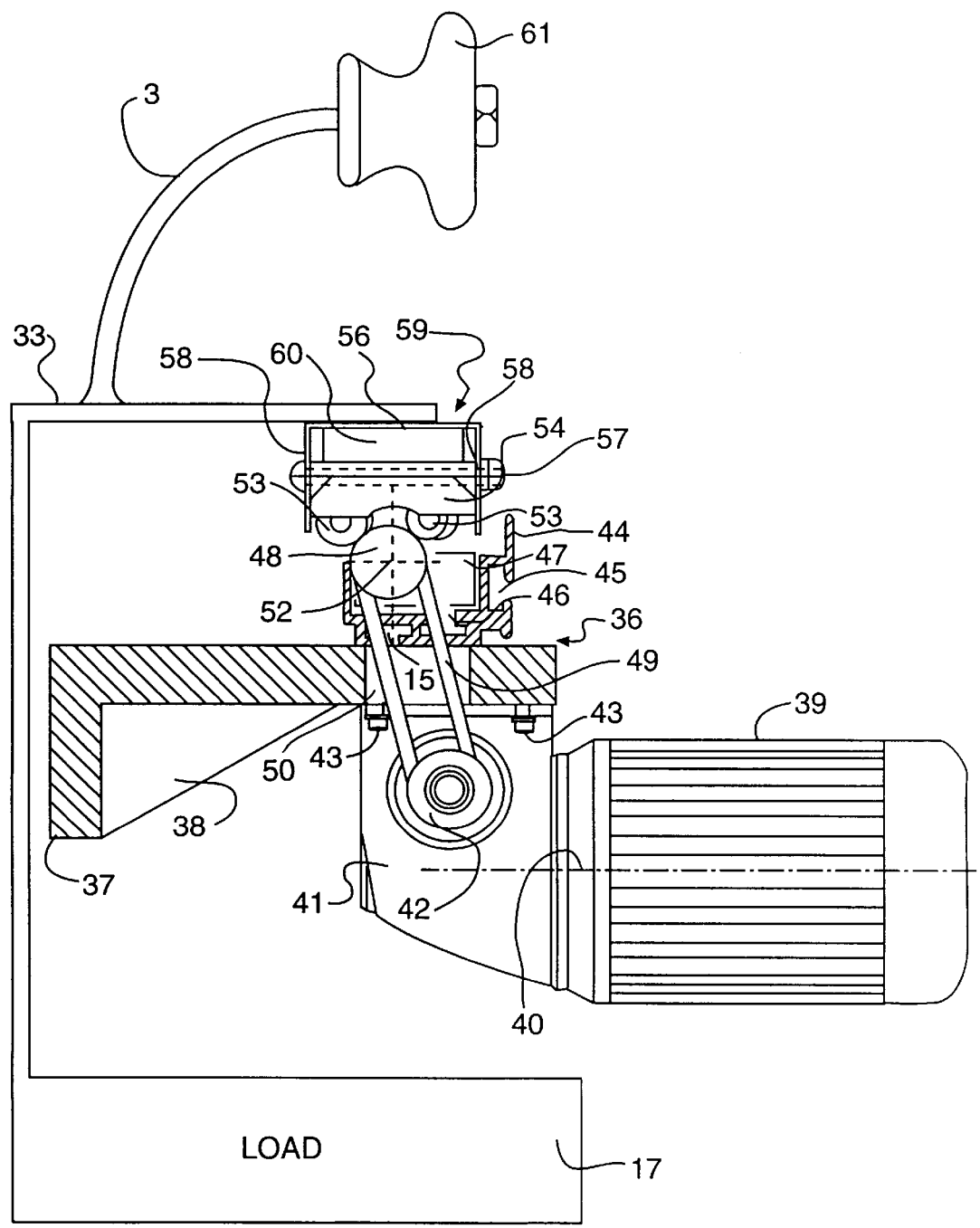
FIG. 4 is a cross sectional view through a section of the overhead conveyer on line IV—IV of FIG. 2.

In FIG. 4, extending substantially along the entire transporting path, there is the stationary frame 36, which may be attached to the factory ceiling, factory wall, or factory floor, for example. The frame 36, by way of example, comprises an L-shaped steel structural member 37 having a plurality of reinforcing webs 38 at spaced intervals.

A conventional drive motor 39 having a drive shaft (not shown) along axis 40 is mounted on a standard mechanical transmission 41. The transmission 41 has a power input drivingly coupled to the rotational power output of the drive motor, and further has a rotational power output including a belt drive pulley 42. While an electric motor 39 is provided in the preferred embodiment, the drive motor may be hydraulic, pneumatic, or like rotational type power supply, or a linear type motor according to the broader aspects of the present invention. Preferably, the mechanical transmission 41 is a worm gear speed reduction unit, but this mechanical transmission, according to the broader aspects of the invention, may consist of a single shaft coupling if gear reduction is not needed. The motor 39 is connected to the frame 36 by being securely fastened to the side of the mechanical transmission 41, which mechanical transmission is in turn directly connected by means of bolts 43 to the frame 36.

A channel 44 is bolted, for example by means of the same bolts 43, to the frame 36 on the opposite side of the frame 36 from the motor 39 and mechanical transmission 41. The channel 44 is preferably sufficiently rigid for its function, but also bendable along the transporting path, which may be curved. The channel 44 comprises a plurality of aligned and identical cross-sectionally shaped extruded aluminum sections having outwardly facing keyhole shaped slots 45 to provide for mounting of the channel 44 on vertical and horizontal surfaces, as well as inwardly facing keyhole shaped slot 46 for the mounting of a plurality of bearing blocks 47 at spaced locations along the transporting path. The bearing blocks 47 do not in any way encumber or overlap the topmost portion of the periphery of a drive shaft 48, which is rotatably supported by the bearing blocks 47 in the channel 44.

The drive shaft 48 is made up of a plurality of drivingly discontinuous sections, with each section being supported by a plurality of bearings within respective bearing blocks 47 and being driven by a separate drive combination of electric motor 39, mechanical transmission 41 and power connection 49, which power connection 49 is a belt extending from the pulley 42 through a suitable aperture 50 within the frame 36 to a drive pulley structure on the section of the drive shaft 48. The power connection 49 may be a standard V-belt, chain, toothed belt, or the like. The pulley structure for the section of the drive shaft has a structure complimentary to the belt, as does the structure of the pulley 42. For that portion of the periphery of the drive shaft 48 that extends above and free of the bearing block 47, the power connection 49, or belt does not extend beyond such peripheral portion and preferably is cylindrically coextensive with the drive shaft 48. The shaft is preferably a hollow, cylindrical aluminum shaft having an outer cylindrical surface, and the curved sections are preferably flexible elastomeric cylindrical shafts of the same diameter with the same cylindrical outer periphery or interdigitated segments (not shown), for example.

To convert the rotary driven motion of the shaft 48, which shaft has a shaft axis 52 extending along the transporting path direction, into a linear motion along the direction of the transporting path, at least one or two and most preferably four driven wheels 53 engage the topmost periphery or free periphery of the shaft 48. Each of these driven wheels 53 is mounted for rotation about a driven wheel axis that is non-parallel to the drive shaft axis 52 and non-perpendicular to the drive shaft axis 22, preferably being at an acute angle thereto; the angle being selected according to desired linear speed and linear force along the conveying path. The driven wheels 53 are divided into two sets, with each set having their axes of rotation being within a non-vertical, non-horizontal plane that is parallel (tangent) to the drive shaft axis 52, with the planes intersecting each other. Thereby, when the drive shaft 48 rotates, the driven wheels 53 engage the drive shaft 48 to form a helical loci of engagement about the periphery of the drive shaft 48 so as to linearly power the driven wheels 53 along the transporting path in a direction of the transporting path that depends upon the direction of rotation of the drive shaft 48, in a manner analogous to a worm gear or threaded-type engagement. In fact, according to broader aspects of the present invention, the drive shaft may be a worm gear or threaded shaft and the driven wheels may be a fixed driven element or driven wheels that extend within or interengage with the worm gear or the threaded shaft.

The driven wheels 53 are rotatably mounted on a second carriage portion 54, which is preferably a formed sheet metal channel of U-shape (as seen in an elevational view on a plane perpendicular to the drawing). A drive connector 59 comprises a U-shaped formed sheet metal piece 56, which as shown overlaps the opposed ends of the second carriage portion 54. The drive connector 59 includes a bolt 57 secured in some suitable manner, for example by welding, to the second carriage portion 54 and extending through suitable vertically elongated holes 58 within the sheet metal piece 56 to have a head at its lower end and a washer and nut at its upper end. The U-shaped formed sheet metal piece 56 is rigidly connected to the first carriage portion 33 suspending the load 17, for example by welding or bolting, and the holes 58 therein receive the bolt 57 to thereby provide a horizontally driving connection between the first carriage portion 33 and the second carriage portion 54 in the direction of the conveying path. A compressible material 60 such as foam rubber, extends between the U-shaped formed sheet metal piece 56 and the carriage portion 54 that mounts the driven wheels 53, for absorbing vibration and shock between the driven wheels 23 and the drive shaft 18 for providing sufficient engagement traction force between the driven wheels 53 and the drive shaft 48 to power the carriage along the conveying path. The bolt 57 provides a pivotal connection about a horizontal pivot axis, to accommodate irregularities in engagement between the driven wheels 53 and the drive shaft 48 along the transporting path.

Weight of the load 17 and carriage portion 33 is carried by the sheet metal piece 56 through the bias member 60, through carriage portion 54, through the driven wheels 53 to the drive shaft 48. More generally the carriage as a broader term includes the bolt 57, carriage portions 33, 54, 56, bias member 60 and driven wheels 53, and may carry automatically readable address coding (not shown).

Wheel 61, rotatably mounted, is used by the transfers 18, 20 and supports the carriage and product on the fixed drag rails 24 and 14.

Figure 3:
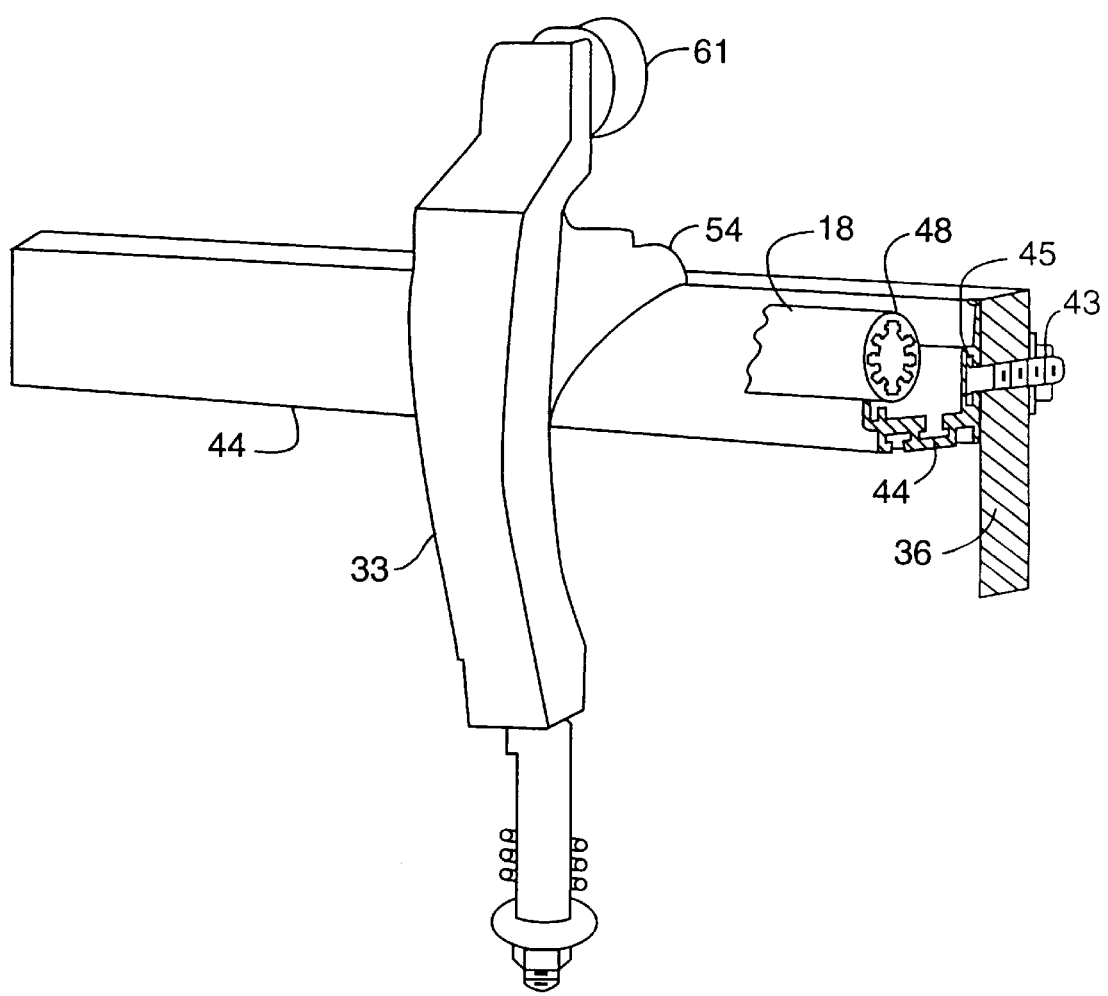
FIG. 3 is a partial perspective view of a portion of the conveyer shown in FIG. 2.

In FIG. 3, the carriage is shown in greater detail than in FIG. 4, and a different connection between the channel and frame is shown (many different connections may be used in the same system).

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

I claim:

1. A product oven treating system, comprising: an oven for treating products;

an oven for treating products;

said oven having an oven input and an oven output:

a plurality of carriages for suspending the products;

an overhead conveyor system for suspending said carriages and transporting said carriages serially along a first conveying path leading to said oven input, in parallel along a plurality of second conveying paths passing through said oven, and serially along a third conveying path leading away from said oven output;

said overhead conveyor system comprising a first overhead powered conveyor at least partly forming said first conveying path, a plurality of second overhead conveyors forming said second conveying paths, a third overhead powered conveyor at least partly forming said third conveying path, an input carriage transfer to selectively transfer at least some of said carriages from said first overhead conveyor to a selected one of said second overhead conveyors, and an output carriage transfer to transfer at least some of said carriages on one of said second overhead conveyors to said third overhead powered conveyor;

a stationary frame extending along each of said first conveying path, second conveying paths and third conveying path;

said first overhead powered conveyor, at least one of said second overhead conveyors and said third overhead powered conveyor, having respective first, second and third drives mounted to said stationary frame, each of said drives having a rotational power output at a determined speed, with the speed of said first and third drives being faster than the speed of said second drives;

said first overhead powered conveyor, said one of said second overhead conveyors and said third overhead powered conveyor having respective first, second and third drive shafts respectively extending along said first conveying path, at least one of said second conveying paths and said third conveying path;

said drive shafts being mounting to said stationary frame for rotation about respective shaft axes parallel to the respective ones of said conveying paths;

said first overhead powered conveyor, said one of said second overhead conveyors and said third overhead powered conveyor having respective power connections between said drives and said drive shafts for rotatable driving said drive shafts about said shaft axes;

said carriages each having a driven wheel rotatable about a drive axis nonparallel and non-perpendicular to said shaft axis, and said driven wheel engaging a top portion of said drive shaft with sufficient traction so as to form a helical loci of engagement about the periphery of said drive shaft during rotation of said drive shaft about said shaft axis to power said carriage along the conveying path in a direction of the conveying path dependent upon a direction of rotation of said drive shaft;

wherein said carriages suspend the products vertically below said drive shaft;

said drive shaft is cylindrical with a cylindrical periphery;

the mounting of each of said drive shafts to said stationary frame includes a rigid upwardly opening channel extending along the conveying path and being fixedly connected to said frame;

a plurality of bearings mounted in said channel rotatable supporting said drive shaft, so that said top portion of said drive shaft extends above said channel;

a support roller being rotatable mounted on said carriage about an axis transverse to said shaft axis;

said support roller being spaced transversely from and out of contact with said drive shaft;

said transfers selectively engaging said support roller and moving said carriage between engagement with one of said first and third overhead powered conveyors and engagement with one of said second overhead conveyors; and wherein there are only two of said second overhead conveyors, one of said second overhead conveyors being a powered overhead conveyor, and another of said second overhead conveyors having a fixed rail engaging said support roller for free rolling support of a carriage.

2. A system according to claim 1, wherein said fixed rail has an upstream portion extending from said first overhead powered conveyor at said oven input to a first position extending perpendicular to said first overhead powered conveyor and to a lateral side of said first overhead powered conveyor that is away from said third overhead powered conveyor, a mid portion extending from said first position parallel to said one of said second overhead conveyors to a second position to said lateral side of said third overhead powered conveyor, and a downstream portion extending from said second position to said third overhead powered conveyor at said oven outlet, with said upstream, mid and downstream portions forming a canted U-shape.

3. A system according to claim 2, wherein adjacent carriages supporting a product are spaced apart a product length distance that is a greater distance than spacing between one of said second overhead conveyors and said mid portion; and alternate ones of said carriages on said first and third overhead conveyors are adjacent to each other on a respective one of said second overhead conveyors and at a spacing substantially less than said product length distance.

4. A system according to claim 1, wherein at least two of said carriages support each of the products, are serially adjacent on said first overhead powered conveyor, are serially adjacent on said third overhead powered conveyor, and are on respective ones of said second overhead conveyors in said oven.

5. A system according to claim 1, wherein said first conveying path is perpendicular to said second conveying paths at said oven input; and wherein said third conveying path is perpendicular to said second conveying paths at said oven output.

6. A system according to claim 1, wherein said carriages hold said products in lengthwise alignment along said first and third overhead powered conveyors; and said carriages hold said products in parallel closely spaced relationship in said oven with their length at an acute angle to their length on said first and third overhead powered conveyors at said oven inlet and oven outlet.

7. A product conveying system for moving products to and from an area having an input and an output, comprising:

a plurality of carriages for suspending the products;

an overhead conveyor suspending said carriages and transporting said carriages serially along a first conveying path leading to said input, in parallel along a plurality of second conveying paths passing through said area, and serially along a third conveying path leading away from said output;

said overhead conveyor comprising a first overhead powered conveyor at least partly forming said first conveying path, a plurality of second overhead conveyors forming said second conveying paths, a third overhead powered conveyor at least partly forming said third conveying path, an input carriage transfer to selectively transfer at least some of said carriages from said first overhead conveyor to a selected one of said second overhead conveyors, and an output carriage transfer to transfer at least some of said carriages on one of said second overhead conveyors to said third overhead powered conveyor;

a stationary frame extending along each of said first conveying path, second conveying paths and third conveying path;

said first overhead powered conveyor, at least one of said second overhead conveyors and said third overhead powered conveyor, having respective first, second and third drives mounted to said stationary frame, each of said drives having a rotational power output at a determined speed, with the speed of said first and third drives being faster than the speed of said second drives;

said first overhead powered conveyor, said one of said second overhead conveyors and said third overhead powered conveyor having respective first, second and third drive shafts respectively extending along said first conveying path, at least one of said second conveying paths and said third conveying path;

said drive shafts being mounting to said stationary frame for rotation about respective shaft axes parallel to the respective ones of said conveying paths;

said first overhead powered conveyor, said one of said second overhead conveyors and said third overhead powered conveyor having respective power connections between said drives and said drive shafts for rotatable driving said drive shafts about said shaft axes;

said carriages each having a driven wheel rotatable about a drive axis nonparallel and non-perpendicular to said shaft axis, and said driven wheel engaging a top portion of said drive shaft with sufficient traction so as to form a helical loci of engagement about the periphery of said drive shaft during rotation of said drive shaft about said shaft axis to power said carriage along the conveying path in a direction of the conveying path dependent upon a direction of rotation of said drive shaft;

wherein said carriages suspend the products vertically below said drive shaft;

said drive shaft is cylindrical with a cylindrical periphery;

the mounting of each of said drive shafts to said stationary frame includes a rigid upwardly opening channel extending along the conveying path and being fixedly connected to said frame;

a plurality of bearings mounted in said channel rotatable supporting said drive shaft, so that said top portion of said drive shaft extends above said channel;

a support roller being rotatable mounted on said carriage about an axis transverse to said shaft axis;

said support roller being spaced transversely from and out of contact with said drive shaft;

said transfers selectively engaging said support roller and moving said carriage between engagement with one of said first and third overhead powered conveyors and engagement with one of said second overhead conveyors; and wherein there are only two of said second overhead conveyors, one of said second overhead conveyors being a powered overhead conveyor, and another of said second overhead conveyors having a fixed rail engaging said support roller for free rolling support of a carriage.

8. A system according to claim 7, wherein said fixed rail has an upstream portion extending from said first overhead powered conveyor at said input to a first position extending perpendicular to said first overhead powered conveyor and to a lateral side of said first overhead powered conveyor that is away from said third powered overhead conveyor, a mid portion extending from said first position parallel to said one of said second overhead conveyors to a second position to said lateral side of said third overhead powered conveyor, and a downstream portion extending from said second position to said third overhead powered conveyor at said outlet, with said upstream, mid and downstream portions forming a canted U-shape.

9. A system according to claim 8, wherein adjacent carriages supporting a product are spaced apart a product length distance that is a greater distance than spacing between one of said second overhead conveyors and said mid portion; and alternate ones of said carriages on said first and third overhead conveyors are adjacent to each other on a respective one of said second overhead conveyors and at a spacing substantially less than said product length distance.

10. A system according to claim 7, wherein at least two of said carriages support each of the products, are serially adjacent on said first overhead powered conveyor, are serially adjacent on said third overhead powered conveyor, and are on respective ones of said second overhead conveyors in said area.

11. A system according to claim 7, wherein said first conveying path is perpendicular to said second conveying paths at said input; and wherein said third conveying path is perpendicular to said second conveying paths at said output.

12. A system according to claim 7, wherein said carriages hold said products in lengthwise alignment along said first and third overhead powered conveyors; and said carriages hold said products in parallel closely spaced relationship in said area with their length at an acute angle to their length on said first and third overhead powered conveyors at said inlet and outlet.

13. A system according to claim 7, wherein said conveyor forms a buffer within said area.

* * * * *